(12) United States Patent
Li et al.

(10) Patent No.: US 11,489,331 B2
(45) Date of Patent: *Nov. 1, 2022

(54) LEAKAGE CURRENT DETECTION AND PROTECTION DEVICE, AND POWER CONNECTOR AND ELECTRICAL APPLIANCE EMPLOYING THE SAME

(71) Applicant: Chengli Li, Suzhou (CN)

(72) Inventors: Chengli Li, Suzhou (CN); Long Chen, Suzhou (CN)

(73) Assignee: Chengli Li, Suzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/349,133

(22) Filed: Jun. 16, 2021

(65) Prior Publication Data

US 2021/0313796 A1    Oct. 7, 2021

Related U.S. Application Data

(63) Continuation-in-part of application No. 17/314,976, filed on May 7, 2021, which is a continuation-in-part
(Continued)

(30) Foreign Application Priority Data

Oct. 10, 2019    (CN) .......................... 201910957936.6
Oct. 10, 2019    (CN) .......................... 201921690901.2
(Continued)

(51) Int. Cl.
*H02H 7/00*    (2006.01)
*H02H 7/20*    (2006.01)
*H02H 1/00*    (2006.01)

(52) U.S. Cl.
CPC ............ *H02H 7/20* (2013.01); *H02H 1/0007* (2013.01)

(58) Field of Classification Search
None
See application file for complete search history.

(56) References Cited

U.S. PATENT DOCUMENTS

8,436,739 B2    5/2013    Elms et al.
9,312,680 B2    4/2016    Li et al.
(Continued)

*Primary Examiner* — Stephen W Jackson
(74) *Attorney, Agent, or Firm* — Chen Yoshimura LLP (57) ABSTRACT

A leakage current detection and protection device includes a leakage current detection module for generating a detection feedback signal when detecting a leakage current on the power supply lines, wherein the power supply lines supply a working power to the leakage current detection module during half of the AC power cycles; a self-test module for testing whether the leakage current detection module is faulty based on the detection feedback signal, which includes: a simulated leakage current generating circuit for generating a simulated leakage current signal; a fault signal generating module for generating a self-test fault signal when the leakage current detection module has a fault; and a self-test compensation module for supplying an auxiliary working power to the leakage current detection module so the leakage current detection module is in a working state whenever the simulated leakage current is generated. This prevents misjudgment by the leakage current detection module.

19 Claims, 5 Drawing Sheets

Related U.S. Application Data of application No. 16/653,457, filed on Oct. 15, 2019, now Pat. No. 11,018,496.

(30) Foreign Application Priority Data

| Apr. 30, 2021 | (CN) | 202110481057.8 |
| Apr. 30, 2021 | (CN) | 202120930948.2 |
| Jun. 8, 2021 | (CN) | 202110634949.7 |
| Jun. 8, 2021 | (CN) | 202121267485.2 |

(56) References Cited

U.S. PATENT DOCUMENTS

| 9,906,014 B2 | 2/2018 | Gao et al. | |
| 11,018,496 B2 | 5/2021 | Li et al. | |
| 2008/0225448 A1 | 9/2008 | Li et al. | |
| 2016/0363627 A1 | 12/2016 | Epee | |
| 2018/0109102 A1* | 4/2018 | Li | H02H 3/335 |
| 2018/0149690 A1* | 5/2018 | Li | H02H 3/338 |

* cited by examiner

LEAKAGE CURRENT DETECTION AND PROTECTION DEVICE, AND POWER CONNECTOR AND ELECTRICAL APPLIANCE EMPLOYING THE SAME

BACKGROUND OF THE INVENTION

Field of the Invention

This invention relates to electrical appliances, and in particular, it relates to a leakage current detection and protection device with a self-test compensation module, as well as power connector and electrical appliance employing the same.

Description of Related Art

In conventional leakage current detection and protection devices, based on cost, reliability, and other considerations, the power source for the leakage current detection module typically employs a half-bridge rectifier. Thus, such leakage current detection and protection devices detect leakage current in the power supply lines in only half of the alternating current (AC) cycles. I.e., its working time is half cycles of the of the AC power. When a self-test function is introduced in such a leakage current detection and protection device, the timing of the generation of the simulated leakage current signal by the self-test module is uncertain; for example, the simulated leakage current may be generated at the edge of the working half-cycle or during a non-working half-cycle of the leakage current detection module. Thus, even when the leakage current detection module is not faulty, the device still may not correctly detect the simulated leakage signal to generate the detection feedback signal, causing the self-test module to mistakenly determine that the leakage current detection module is faulty thereby mistakenly cutting off the power supply to the load.

SUMMARY

To solve the above-described problem, embodiments of the present invention provide a leakage current detection and protection device which includes a self-test compensation module, which functions to supply an auxiliary working power to the leakage current detection module, so as to ensure that when the simulated leakage current is generated, the leakage current detection module is always in a working state. This way, any time the self-test modules triggers a self-test operation, the self-test can be reliably completed, thereby avoiding mistakes in the judgement regarding whether the leakage current detection module is faulty.

In one aspect, the present invention provides a leakage current detection and protection device coupled to power supply lines which carry an alternating current (AC) power, the device including: a leakage current detection module, configured to detect a leakage current present on the power supply lines and to generate a detection feedback signal in response to detecting the leakage current, wherein the leakage current detection module receives a working power supplied by the power supply lines during a half of each cycle of the AC power; a self-test module, configured to test whether the leakage current detection module is faulty based on the detection feedback signal, the self-test module including: a simulated leakage current generating circuit, configured to generate a simulated leakage current signal which simulates a leakage current signal on the power supply lines; a fault signal generating module, configured to generate a self-test fault signal when the leakage current detection module has a fault; and a self-test compensation module, configured to supply an auxiliary working power to the leakage current detection module, wherein the leakage current detection module is in a working state whenever the simulated leakage current is generated.

In one embodiment, the self-test compensation module includes: an energy storage module, configured to store energy obtained from the power supply lines; and a power supply coupling element, configured to couple the energy storage module to a power supply circuit of the leakage current detection module to provide the auxiliary power to the leakage current detection module.

In one embodiment, the energy storage module includes serial connected first resistor and first capacitor, wherein the first capacitor is charged by the power supply lines via the first resistor, and wherein the first capacitor is configured to provide power to the leakage current detection module via the power supply coupling element.

In one embodiment, the power supply coupling element includes one or more of: an unidirectional conducting element, a controllable semiconductor device, and a resistor.

In one embodiment, the self-test module further includes: a simulated leakage current trigger circuit, configured to generate a simulated leakage current trigger signal; and a trigger signal turn-off module, configured to turn off the simulated leakage current trigger signal in response to the detection feedback signal, wherein the simulated leakage current generating circuit is configured to generate the simulated leakage current signal in response to the simulated leakage current trigger signal, and wherein the fault signal generating module is coupled to the simulated leakage current trigger circuit.

In one embodiment, the first capacitor is configured to supply the auxiliary working power to the leakage current detection module or to ceases supply of the auxiliary working power to the leakage current detection module in response to the simulated leakage current trigger signal being generated or turned off, respectively.

In one embodiment, the simulated leakage current trigger circuit includes a trigger diode, having one end coupled between the first resistor and the first capacitor, and another end coupled to the power supply coupling element, and wherein the trigger diode is configured to generate the simulated leakage current trigger signal when it is conductive.

In one embodiment, the first capacitor is configured to provide the auxiliary working power to the leakage current detection module during entire cycles of the AC power.

In one embodiment, the simulated leakage current trigger circuit, the simulated leakage current generating circuit, the trigger signal turn-off module, the fault signal generating module and the self-test compensation module include only discrete components.

In one embodiment, the leakage current detection and protection device further includes: a fault response module, configured to generate an audible or visible alarm signal as a fault indicator, or to disconnect the power supply lines, in response to the self-test fault signal.

In a second aspect, the present invention provides an electrical power connection device, which includes: a body; and the leakage current detection and protection device described above, disposed inside the body.

In a third aspect, the present invention provides an electrical appliance, which includes: an electrical load; and an electrical power connection device coupled between a power supply and the load to supply power to the load, where the electrical power connection device includes the leakage current detection and protection device described above.

In embodiments of the present invention, the self-test compensation module supplies the auxiliary working power to the leakage current detection module, so as to ensure that any time the self-test modules triggers a self-test operation, the self-test can be reliably completed, thereby avoiding mistakes in the judgement regarding whether the leakage current detection module is faulty.

BRIEF DESCRIPTION OF THE DRAWINGS

Preferred embodiments of the present invention are described with reference to the drawings. These drawings explain the embodiments and their operating principle, and only illustrate structures that are necessary to the understanding of the invention. These drawings are not to scale. In the drawings, like features are designated by like reference symbols. In the block diagrams, lines between blocks represent electrical or magnetic coupling of the blocks; the absence of lines between blocks does not mean the lack of coupling.

DETAILED DESCRIPTION OF PREFERRED EMBODIMENTS

Preferred embodiments of the present invention are described below with reference to the drawings. These drawings and descriptions explain embodiments of the invention but do not limit the invention. The described embodiments are not all possible embodiments of the present invention. Other embodiments are possible without departing from the spirit and scope of the invention, and the structure and/or logic of the illustrated embodiments may be modified. Thus, it is intended that the scope of the invention is defined by the appended claims.

Before describing the embodiments, some terms used in this disclosure are defined here to help the reader better understand this disclosure. In this disclosure, a transistor may be of any type and structure, such as field-effect transistor (FET) including metal-oxide-semiconductor field-effect transistor (MOSFET), bipolar junction transistor (BJT), silicon controlled rectifier (SCR), etc. When the transistor is a FET, the control electrode refers to the gate of the FET, the first electrode may be the drain or source of the FET, and the corresponding second electrode may be the source or drain of the FET. When the transistor is a BJT, the control electrode refers to the base of the BJT, the first electrode may be the collector or emitter of the BJT, and the corresponding second electrode may be the emitter or collector of the BJT. When the transistor is an SCR, the control electrode refers to the control electrode G of the SCR, the first electrode may be the anode, and the corresponding second electrode may be the cathode. A simulated leakage current signal is a periodic signal generated by the self-test module. Because it has a relatively short duration, although the leakage current detection module can detect the simulated leakage current signal, it will not cause the device to trip and interrupt the power connection.

Embodiments of the present invention provide a leakage current detection and protection device, where the self-test module includes a self-test compensation module which functions to supply an auxiliary working power to the leakage current detection module, so as to ensure that any time the self-test modules triggers a self-test operation, the self-test can be reliably completed, thereby avoiding mistakes in the judgement regarding whether the leakage current detection module is faulty.

Figure 1:
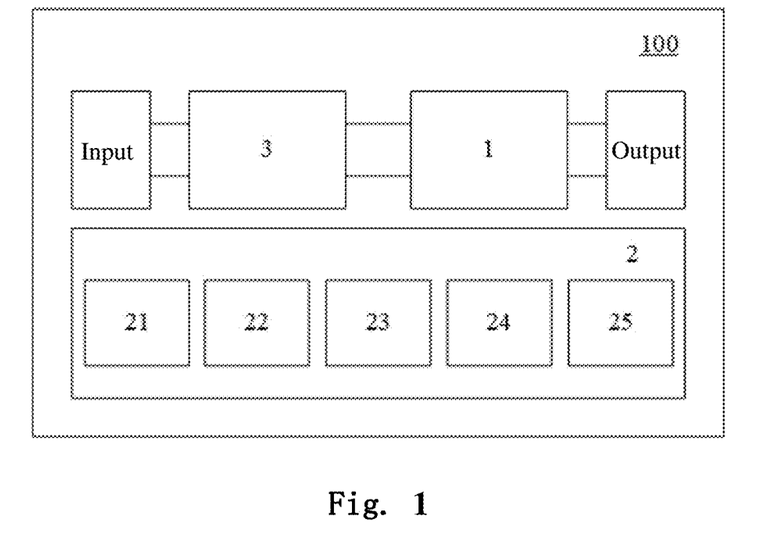
FIG. 1 is a schematic block diagram illustrating a leakage current detection and protection device according to embodiments of the present invention.

FIG. 1 is a schematic block diagram of a leakage current detection and protection device according to embodiments of the present invention.

As shown in FIG. 1, the leakage current detection and protection device 100 includes a leakage current detection module 1, a self-test module 2, and a fault response module 3. The leakage current detection module 1 is coupled between the input and output ends of the power supply lines, and configured to detect any leakage current present on the power supply lines. The power supply lines provides an AC power on its input terminals, and supplies a working power to the leakage current detection module 1 during a half of each cycle of the AC power. The self-test module 2 is coupled to the power supply lines and the leakage current detection module 1, configured to periodically generate a simulated leakage current signal, which is used to test whether the leakage current detection module 1 is faulty. The self-test module 2 includes a simulated leakage current trigger circuit 21, a simulated leakage current generating circuit 22, a trigger signal turn-off module 23, a fault signal generating module 24, and a self-test compensation module 25.

The simulated leakage current trigger circuit 21 is configured to periodically generate a simulated leakage current trigger signal. The simulated leakage current generating circuit 22 is coupled to the simulated leakage current trigger circuit 21, configured to receive the simulated leakage current trigger signal, and to generate a simulated leakage current signal in response to the simulated leakage current trigger signal. The simulated leakage current signal simulates a leakage current signal on the power supply lines. Thus, when the simulated leakage current generating circuit 22 generates the simulated leakage current signal, the leakage current detection module 1 detects the simulated leakage current signal and generates a detection feedback signal. The detection feedback signal is provided to the trigger signal turn-off module 23, which turns off the simulated leakage current trigger signal in response to the detection feedback signal. As a result, the simulated leakage current signal is turned off.

The fault signal generating module 24 is coupled to the simulated leakage current trigger circuit 21, and configured to monitor whether the simulated leakage current trigger signal is turned off or not. If the leakage current detection module 1 is faulty, and as a result the simulated leakage current trigger signal cannot be turned off, the fault signal generating module 24 generates a self-test fault signal and provides it to the fault response module 3.

The self-test compensation module 25 is coupled to the leakage current detection module 1, and supplies an auxiliary working power to the leakage current detection module 1, so as to ensure that when the simulated leakage current is generated, the leakage current detection module 1 is always in a working state.

The fault response module 3 is coupled on the power supply lines between the input and output ends, and is configured to disconnect the power supply to the output end in response to the self-test fault signal. In other alternative embodiments, the fault response module 3 may be configured to generate an audible or visible alarm signal as a fault indicator in response to the self-test fault signal.

In some embodiments, the self-test compensation module 25 includes an energy storage module and a power supply coupling element (not shown in FIG. 1). The energy storage module is configured to store energy obtained from the power supply lines, and the power supply coupling element is configured to couple the energy storage module to the power supply circuit of the leakage current detection module 1, so as to provide power to the leakage current detection module 1.

In some embodiments, the energy storage module includes serial connected first resistor and first capacitor. The power supply lines charge the first capacitor via the first resistor. Within the same half-cycles of the AC power, the power supply lines both provide power to the leakage current detection module 1 and charge the first capacitor. Alternatively, the power supply lines may charge the first capacitor during both half-cycles of the AC power. The first capacitor functions to provide power to the leakage current detection module 1 via the power supply coupling element.

In some embodiments, the power supply coupling element may include one or more of: an unidirectional conducting element, a controllable semiconductor device, and a resistor. Unidirectional conducting elements may include, without limitation, diodes; controllable semiconductor devices may include, without limitation, trigger diodes, bipolar junction transistors, field-effect transistors, or photoelectric coupling elements.

Figure 2:
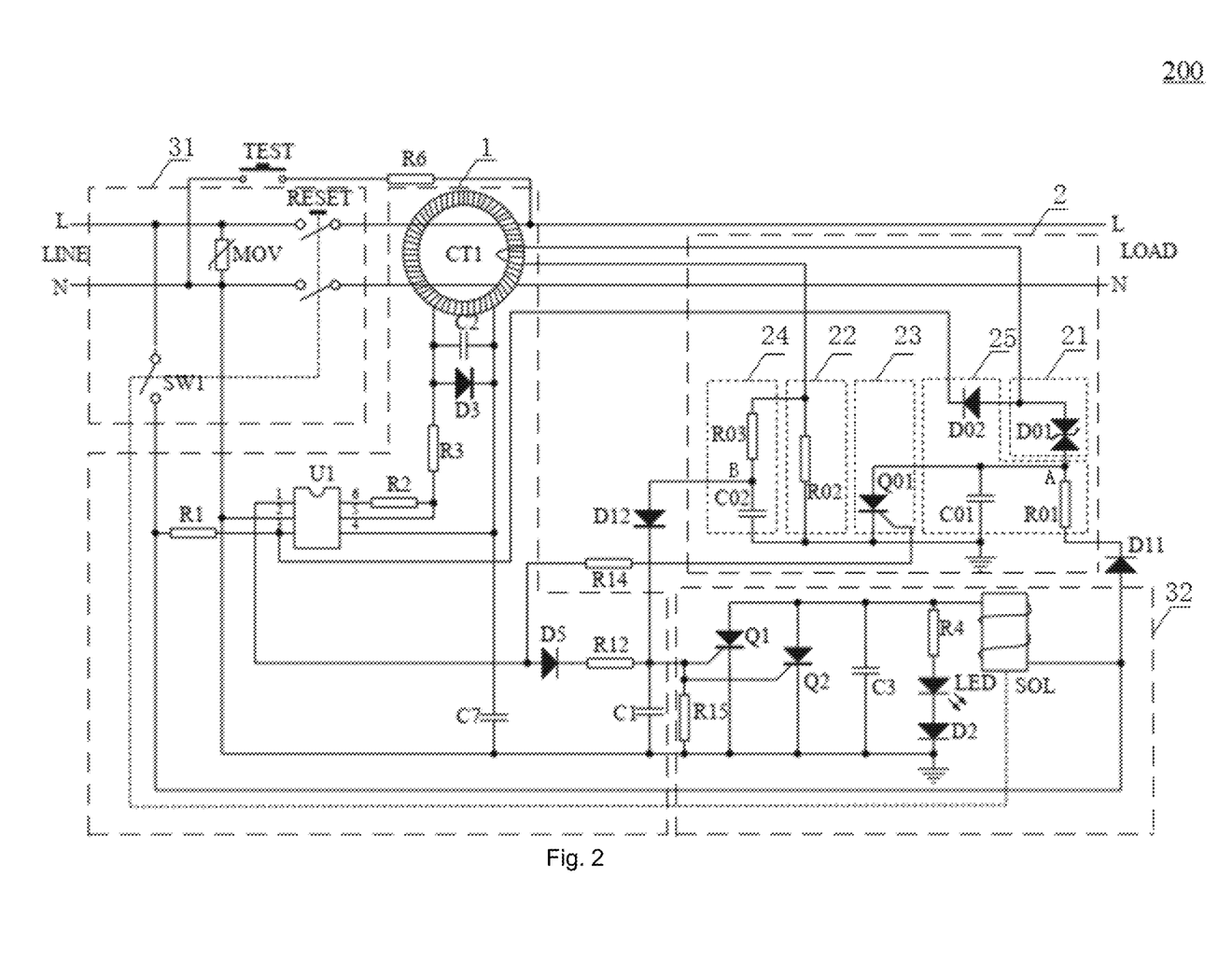
FIG. 2 is an exemplary circuit diagram illustrating a leakage current detection and protection device according to a first embodiment of the present invention.

FIG. 2 is an exemplary circuit diagram illustrating a leakage current detection and protection device according to a first embodiment of the present invention.

As shown in FIG. 2, the leakage current detection and protection device 200 is coupled on the power supply lines between the input end LINE and the output end LOAD. The leakage current detection module 1 includes a leakage current detector coil CT1, through which the power supply lines pass, and a processor chip U1. The fault response module 3 includes a switch module 31 and a drive module 32. The switch module 31 includes a switch SW1 and a reset switch RESET configured to connect and disconnect the output end LOAD from the input end LINE. The drive module 32 includes a switch driving element (such as a solenoid SOL) and two transistors Q1, Q2. The hot line (L) of the power supply lines is coupled to pin 3 of processor U1 via resistor R1, and provides power to processor U1 during the positive half-cycle of the AC power.

When the leakage current detection and protection device functions normally to detect leakage current, the switch SW1 and reset switch RESET are both closed. When the current on the hot line L and neutral line N are balanced, the leakage current detector coil CT1 does not detect a current imbalance. When the current on the hot line L and neutral line N are imbalanced, i.e., there is a leakage current signal, the leakage current detector coil CT1 generates a corresponding voltage signal. The leakage current detector coil CT1 is coupled to pins 4, 5 and 6 of processor U1. When the voltage signal from the leakage current detector coil CT1 is above a threshold, pin 1 of processor U1 outputs a high voltage level; otherwise it outputs a low voltage level. The high voltage level on pin 1 of processor U1 is provided to the two transistors Q1 and Q2, causing either or both of them to become conductive. Consequently, a current flows through the solenoid SOL to generate a magnetic field, which causes switches SW1 and RESET to be open, thereby disconnecting the power to the output end LOAD.

Still referring to FIG. 2, the self-test module 2 includes a simulated leakage current trigger circuit 21, a simulated leakage current generating circuit 22, a trigger signal turn-off module 23, a fault signal generating module 24, and a self-test compensation module 25. In the embodiment of FIG. 2, the self-test compensation module 25 includes serial connected first resistor R01 and first capacitor C01, and diode D02. The simulated leakage current trigger circuit 21 includes a trigger diode D01. One end of the trigger diode D01 is coupled to point A between the first resistor R01 and the first capacitor C01, and another end of the trigger diode D01 is coupled to the anode of diode D02. The cathode of diode D02 is coupled to pin 3 of processor U1.

When the trigger diode D01 is conductive, a simulated leakage current trigger signal is generated. The trigger diode D01 may be, for example, a transient-voltage-suppression diode; more generally, the trigger diode may be any semiconductor element that is triggered to conduct when a voltage across it is above a threshold. In this embodiment, the first resistor R01 an first capacitor C01 not only provide the auxiliary working power to processor U1 via diode D02, but also control the conduction of the trigger diode D01, thereby controlling the time interval of the generation of the simulated leakage current trigger signal. The resistance of the first resistor R01 and the capacitance of the first capacitor C01 may be set based on desired supply voltage for processor U1 and desired time interval of the generation of the simulated leakage current trigger signal.

The simulated leakage current generating circuit 22 includes a second resistor R02 coupled to the trigger diode D01. The hot line (L) is coupled to the first capacitor C01 via diode D11 and first resistor R01, and charges the first capacitor C01 during positive half-cycles of the AC power. When the voltage of the upper plate of the first capacitor C01 (i.e. at point A) reaches the threshold trigger voltage of the trigger diode D01, the trigger diode D01 becomes conductive, and a simulated leakage current signal is generated through the second resistor R02 and flows through the leakage current detector coil CT1. It should be understood that the simulated leakage current signal is generated by the self-test module 2 affirmatively, and functions to simulate the leakage current signal that is present when the power supply lines have a leak. Meanwhile, the first capacitor C01 provides a working power to processor U1 via diode D02. This way, when the simulated leakage current trigger signal and the simulated leakage current signal are generated, the first capacitor C01 provides an auxiliary working power to processor U1. Thus, even if the simulated leakage current trigger signal and the simulated leakage current signal are generated at the edge of a positive half-cycle or during a negative half-cycle of the AC power (when the power supply lines do not supply a working power to processor U1), because the self-test compensation module 25 provides the auxiliary working power to processor U1, processor U1 is in a working state, and therefore can detect the simulated leakage current signal when its components are functioning properly.

When the leakage current detection module 1 is not faulty, it detects the simulated leakage current signal and generates a detection feedback signal. More specifically, the leakage current detector coil CT1 detects the simulated leakage current signal generated by the simulated leakage current generating circuit 22, and generates a corresponding voltage signal. When the voltage signal output by the leakage current detector coil CT1 is greater than a threshold, pin 1 of processor U1 outputs a high voltage level, i.e., the detection feedback signal. The detection feedback signal is provided to the trigger signal turn-off module 23.

The trigger signal turn-off module 23 includes a first semiconductor device. In this embodiment, the first semiconductor device is implemented by a transistor Q01. The high voltage level on pin 1 of processor U1 causes transistor Q01 to become conductive, which provides a discharge path for the first capacitor C01 to turn off the simulated leakage current trigger signal. In other words, the discharge of the first capacitor C01 causes the voltage at its upper plate to drop below the trigger voltage of the trigger diode D01, so that the trigger diode D01 is turned off. Consequently, no simulated leakage current signal is generated via the second resistor R02; also, the first capacitor ceases supply of the auxiliary working power to processor U1.

The fault signal generating module 24 includes serial connected third resistor R03 and second capacitor C02. If the leakage current detection module 1 is faulty and cannot generate the detection feedback signal to turn off the simulated leakage current trigger signal, the second capacitor C02 generates a self-test fault signal. More specifically, the serial connected third resistor R03 and second capacitor C02 are coupled in parallel with the second resistor R02. The point B between the third resistor R03 and the second capacitor C02 is coupled, via diode D12, to transistors Q1 and Q2 of the drive module 32. As described earlier, the simulated leakage current trigger signal triggers the generation of the simulated leakage current signal. Meanwhile, a current flows through the third resistor R03, and this current continuously charges the second capacitor C02. When the leakage current detection module 1 is not faulty, it can generate a detection feedback signal when the simulated leakage current is detected, which in turn turns off the simulated leakage current trigger signal and simulated leakage current signal. Because the simulated leakage current signal lasts only a short time period, the voltage at the upper plate of the second capacitor C02 (i.e. point B) is insufficient to drive the transistors Q1 and Q2. On the other hand, when the leakage current detection module 1 is faulty, it cannot generate a detection feedback signal, i.e. pin 1 of processor U1 continuously outputs a low voltage signal, and therefore cannot trigger transistor Q01 to conduct and turn off the simulated leakage current trigger signal. As a result, the trigger diode D01 stays conductive for a relatively long time period, and the simulated leakage current continues to flow. With the second capacitor C02 continues to be charged, the voltage at its upper plate continues to rise. When the voltage at the upper plate of the second capacitor C02 reaches a predetermined threshold, it drives transistor Q1 and/or Q2 to become conductive. Consequently, a current flows through the solenoid SOL and generates a magnetic field to open switches SW1 and RESET, thereby disconnecting power to the output end.

The fault conditions that may occur in the leakage current detection module 1 include, without limitation: the electrical components in the leakage current detection module 1 (e.g., leakage current detector coil CT1, resistor R1, etc.) becomes open circuit or short circuit; processor U1 is damaged; etc. In these conditions, processor U1 cannot output a high voltage signal. Because while the trigger diode D01 is conductive, the first capacitor C01 supplies power to processor U1 via diode D02, even if the simulated leakage current signal is generated at the edge of a positive half-cycle or during a negative half-cycle of the AC power, processor U1 is still in a working state and can detect the simulated leakage current signal. This ensures the accuracy of the fault signal generated by the fault signal generating module 24, i.e., the fault signal is correctly generated due to fault in the leakage current detection module 1, not mistakenly generated due to the lack of power being supplied to the process U1.

The operation of the self-test module 2 is described below.

During the positive half-cycles of the AC power, the hot line (L) supplies power to processor U1, and at the same time, charges the first capacitor C01 via diode D11 and first resistor R01. After a predefined time period, the voltage at the upper plate of the first capacitor C01 reaches the threshold trigger voltage of the trigger diode D01, triggering the trigger diode D01 to conduct, forming a current path (with a conductor line passing through the leakage current detector coil CT1) so that a simulated leakage current signal is generated through the second resistor R02. Meanwhile, the first capacitor C01 supplies working power to processor U1 via diode D2, which ensures that processor U1 receives the auxiliary working power and is in a working state.

When the leakage current detection module 1 functions normally: The leakage current detector coil CT1 detects the simulated leakage current, and outputs a corresponding voltage to processor U1, causing processor U1 to generate a high voltage level at its pin 1 (detection feedback signal). This high voltage level causes transistor Q01 to be conductive, which provides a discharge path for the first capacitor C01. The first capacitor C01 discharges through transistor Q01, so that the voltage at the upper plate of the first capacitor C01 drops to below the trigger voltage of the trigger diode D01. Consequently, the trigger diode D01 is cut off and no current flows through it, so that no current path is formed for a simulated leakage current. Meanwhile, the first capacitor C01 ceases providing power to processor U1. The above process completes one self-test period. When the next period starts, during the positive half-cycle of the AC power, the first capacitor C01 is charged until its upper plate reaches the trigger voltage of the trigger diode D01, and the above process is repeated.

When the leakage current detection module 1 is faulty: When, for example, the leakage current detector coil CT1 has an open circuit, or the resistor R1 has an open circuit, or the processor chip U1 is damaged, etc., causing the leakage current detection module 1 to lose its leakage current detection and protection ability, the pin 1 of processor U1 continuous to output a low voltage level (i.e. no detection feedback signal), and the first transistor Q01 cannot become conductive. Because the first transistor Q01 is in an off state, it cannot provide a discharge path for the first capacitor C01, so the voltage at the upper plate of the first transistor Q01 causes the trigger diode D01 to be in a continuously conductive state. In this situation, the simulated leakage current continues to flow through the second resistor R02. The current that flows through the third resistor R03 continuously charges the second capacitor C02, causing the voltage at the upper plate of the second capacitor C02 to rise continuously. When the voltage at the upper plate of the second capacitor C02 reaches a predetermined value, it drives transistor Q1 and/or Q2 to be conductive. The current through the transistor Q1 and/or Q2 causes a large current in the solenoid SOL, which generates a magnetic field to open switches SW1 and RESET. This disconnects the power to the output end, protecting the load.

Figure 3:
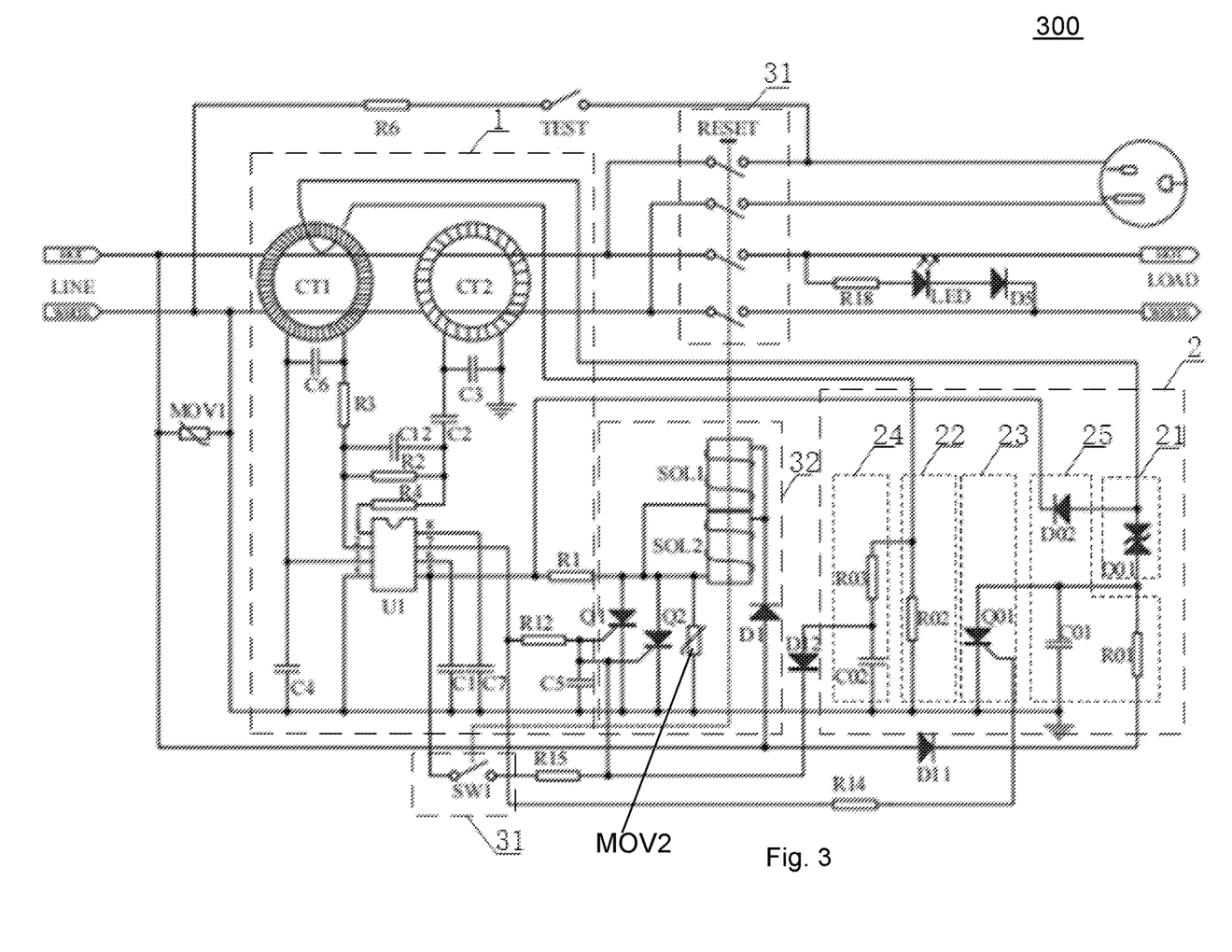
FIG. 3 is an exemplary circuit diagram illustrating a leakage current detection and protection device according to a second embodiment of the present invention.

FIG. 3 is an exemplary circuit diagram illustrating a leakage current detection and protection device according to a second embodiment of the present invention.

One difference between the embodiment of FIG. 3 and the embodiment of FIG. 2 is that, the leakage current detection module 1 of the leakage current detection and protection device 300 in FIG. 3 employs two leakage current detector coils CT1 and CT2, to improve leakage current protection for the neutral line WHITE. Also, two reset switches RESET are provided to connect or disconnect power to the electrical load LOAD and an output power receptacle, respectively. Further, in the fault response module 3, the drive module 32 employs two solenoids SOL1 and SOL2, to provide redundancy in case one of the solenoids becomes defective. The self-test module 2 of the leakage current detection and protection device 300 also includes the self-test compensation module 25, and its diode D02 is coupled to pin 5 of processor U1.

During the positive half-cycles of the AC power, the hot line (L) supplies power to processor U1, and at the same time, charges the first capacitor C01 via diode D11 and first resistor R01. While the trigger diode D01 is conductive, the first capacitor C01 supplies power to processor U1 via diode D02.

The self-test module 2 of the leakage current detection and protection device 300 is the same as that in the embodiment of FIG. 2, and further descriptions are omitted.

Figure 4:
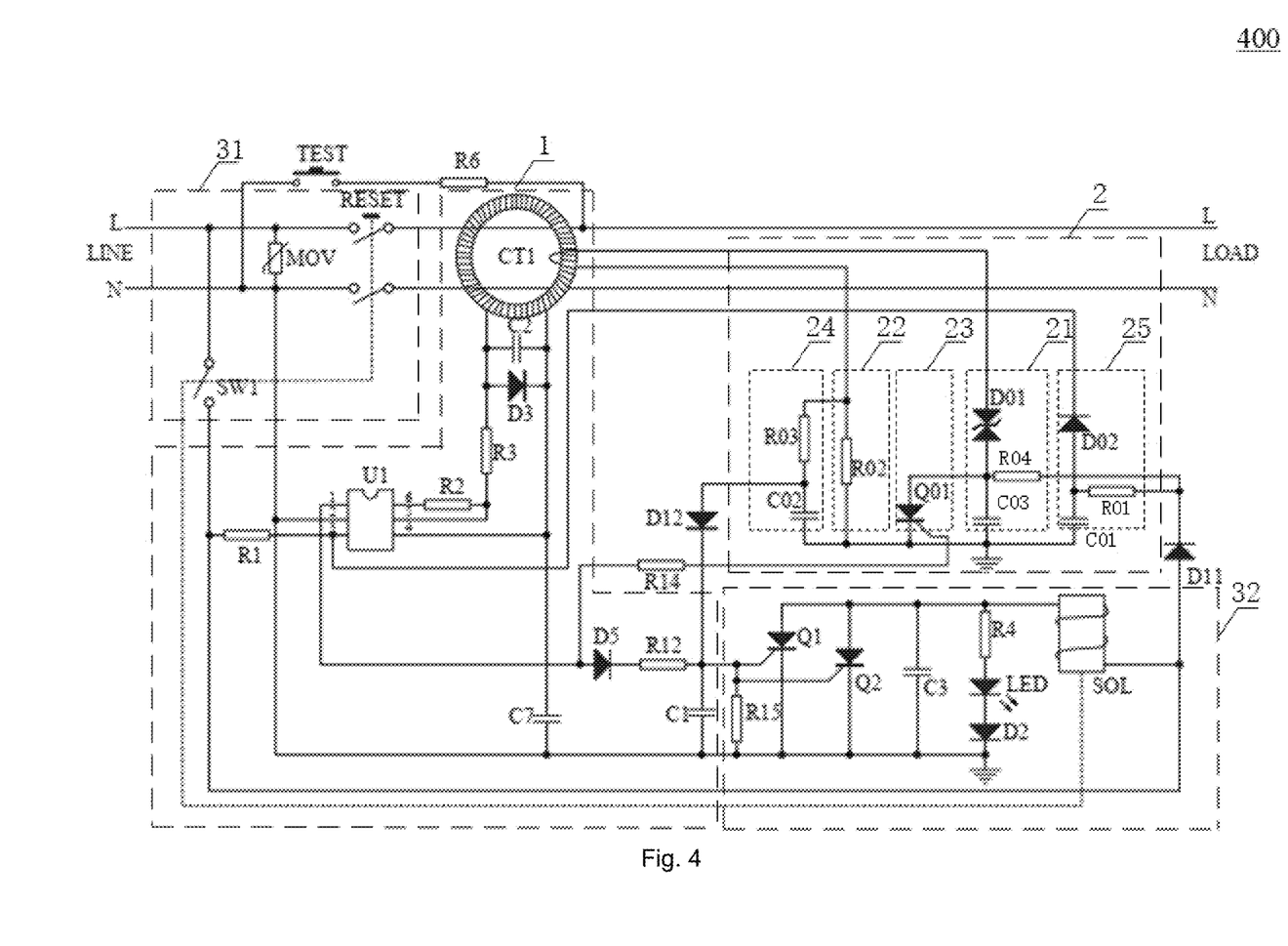
FIG. 4 is an exemplary circuit diagram illustrating a leakage current detection and protection device according to a third embodiment of the present invention.

FIG. 4 is an exemplary circuit diagram illustrating a leakage current detection and protection device according to a third embodiment of the present invention.

One difference between the embodiment of FIG. 4 and the embodiment of FIG. 2 is in the structure and connection of the simulated leakage current trigger circuit 21 and self-test compensation module 25. As shown in FIG. 4, diode D2 of the self-test compensation module 25 is directly coupled to the first capacitor C01, and not coupled to the trigger diode D01. The simulated leakage current trigger circuit 21 includes an additional delay module. In this embodiment, the delay module includes serial connected fourth resistor R04 and third capacitor C03, which are configured to control the conduction of the trigger diode D01, thereby controlling the time interval of the generation of the simulated leakage current trigger signal. By setting the resistance of the fourth resistor R04 and the capacitance of the third capacitor C03, the time interval of the generation of the simulated leakage current trigger signal can be set.

The hot line (L) is coupled to the first capacitor C01 via diode D11 and first resistor R01, and coupled to the third capacitor C03 via diode D11 and fourth resistor R04. During positive half-cycles of the AC power, the hot line (L) charges first capacitor C01 via first resistor R01, and charges third capacitor C03 via fourth resistor R04. Once the voltage of the upper plate of first capacitor C01 triggers diode D02 to be conductive, the first capacitor C01 supplies power to processor U1 via diode D02. Moreover, when the voltage of the upper plate of third capacitor C03 reaches the threshold trigger voltage of the trigger diode D01, the trigger diode D01 is triggered to be conductive to generate a simulated leakage current trigger signal, so that a simulated leakage current signal is generated via resistor R02 and flows through detector coil CT1.

In this embodiment, because the timing of the generation of the simulated leakage current signal is uncertain, the first capacitor C01 is needed to supply power to processor U1 in the entire cycles (i.e. both half cycles) of the AC power, so that processor U1 is always in the working state. The resistance of the first resistor R01 and the capacitance of the first capacitor C01 may be set based on desired supply voltage for processor U1 and desired continued time interval that power is needed for processor U1. Thus, even if the simulated leakage current signal is generated at the edge of a positive half-cycle or during a negative half-cycle of the AC power (when the power supply lines do not supply working power to processor U1), because the self-test compensation module 25 provides the auxiliary working power to processor U1, processor U1 is in a working state, and therefore can detect the simulated leakage current signal when its components are functioning properly. This ensures the accuracy of the fault signal by the fault signal generating module 24, i.e., the fault signal is correctly generated due to fault in the leakage current detection module 1, not mistakenly generated due to a lack of power supplied to the process U1. Other sub-modules of the self-test module 2 are similar to earlier embodiments and detailed descriptions are omitted.

Figure 5:
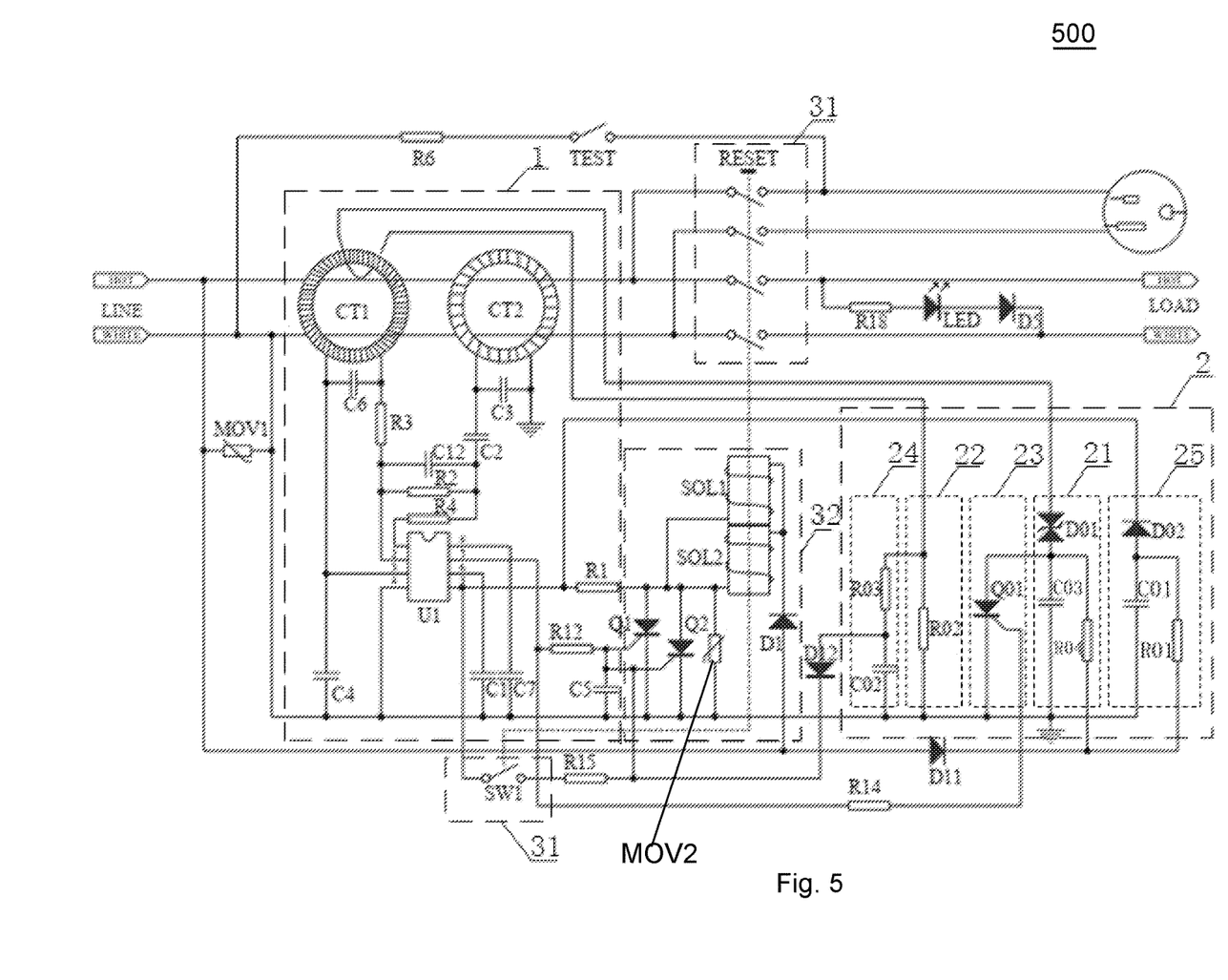
FIG. 5 is an exemplary circuit diagram illustrating a leakage current detection and protection device according to a fourth embodiment of the present invention.

FIG. 5 is an exemplary circuit diagram illustrating a leakage current detection and protection device according to a fourth embodiment of the present invention.

In the embodiment of FIG. 5, in the leakage current detection and protection device 500, the self-test module 2 is the same as that of the embodiment of FIG. 4, and the other modules are the same as those in the embodiment of FIG. 3, and detailed descriptions are omitted here. In this embodiment, the self-test compensation module 25 provides power to processor U1 during the entire cycles of the AC power. Thus, even if the simulated leakage current signal is generated at the edge of a positive half-cycle or during a negative half-cycle of the AC power (when the power supply lines do not supply working power to processor U1), because the self-test compensation module 25 provides the auxiliary working power to processor U1, processor U1 is in a working state, and can detect the simulated leakage current signal and generate the detection feedback signal when its components are functioning properly.

In the above embodiments, the self-test compensation module supplies the auxiliary working power to the leakage current detection module either while the simulated leakage current trigger signal is being generated or continuously over a relatively long time period. Thus, any time the simulated leakage current trigger signal and the simulated leakage current signal are generated, the leakage current detection module is in a working stated because it is always supplied with power, and can correctly detect the simulated leakage current signal and generated the detection feedback signal when its components are functioning properly. This prevents the self-test module from making incorrect determinations due to lack of power supply at the edge of the positive half-cycle or during the negative half-cycle of the AC power. This enhances the accuracy of the self-test function of the self-test module.

While the above embodiments use transistors as examples, it should be understood that the transistors may be replaced by other types of semiconductor devices, such as photoelectric coupling elements, or any switching elements that respond to a control voltage.

Some additional embodiments of the present invention provide an electrical power connection device, which includes a body and a leakage current detection and protection device according to any one of the above embodiments disposed inside the body.

In a third aspect, additional embodiments of the present invention provide an electrical appliance, which includes an electrical load and an electrical power connection device coupled between a power supply and the load to supply power to the load, where the electrical power connection device employs a leakage current detection and protection device according to any one of the above embodiments.

While the present invention is described above using specific examples, these examples are only illustrative and do not limit the scope of the invention. It will be apparent to those skilled in the art that various modifications, additions and deletions can be made to the leakage current detection and protection device of the present invention without departing from the spirit or scope of the invention.

What is claimed is:

1. A leakage current detection and protection device coupled to power supply lines which carry an alternating current (AC) power, the device comprising:
a leakage current detection module, configured to detect a leakage current present on the power supply lines and to generate a detection feedback signal in response to detecting the leakage current, wherein the leakage current detection module receives a working power supplied by the power supply lines during a half of each cycle of the AC power;
a self-test module, configured to test whether the leakage current detection module is faulty based on the detection feedback signal, the self-test module including:
a simulated leakage current generating circuit, configured to generate a simulated leakage current signal which simulates a leakage current signal on the power supply lines;
a fault signal generating module, configured to generate a self-test fault signal when the leakage current detection module has a fault; and
a self-test compensation module, configured to supply an auxiliary working power to the leakage current detection module, wherein the leakage current detection module is in a working state whenever the simulated leakage current is generated.

2. The leakage current detection and protection device of claim 1, wherein the self-test compensation module includes:
an energy storage module, configured to store energy obtained from the power supply lines; and
a power supply coupling element, configured to couple the energy storage module to a power supply circuit of the leakage current detection module to provide the auxiliary power to the leakage current detection module.

3. The leakage current detection and protection device of claim 2, wherein the energy storage module includes serial connected first resistor and first capacitor, wherein the first capacitor is charged by the power supply lines via the first resistor, and wherein the first capacitor is configured to provide power to the leakage current detection module via the power supply coupling element.

4. The leakage current detection and protection device of claim 2, wherein the power supply coupling element includes one or more of: an unidirectional conducting element, a controllable semiconductor device, and a resistor.

5. The leakage current detection and protection device of claim 3, wherein the self-test module further includes:
a simulated leakage current trigger circuit, configured to generate a simulated leakage current trigger signal; and
a trigger signal turn-off module, configured to turn off the simulated leakage current trigger signal in response to the detection feedback signal,
wherein the simulated leakage current generating circuit is configured to generate the simulated leakage current signal in response to the simulated leakage current trigger signal, and wherein the fault signal generating module is coupled to the simulated leakage current trigger circuit.

6. The leakage current detection and protection device of claim 5,
wherein the first capacitor is configured to supply the auxiliary working power to the leakage current detection module or to ceases supply of the auxiliary working power to the leakage current detection module in response to the simulated leakage current trigger signal being generated or turned off, respectively.

7. The leakage current detection and protection device of claim 6,
wherein the simulated leakage current trigger circuit includes a trigger diode, having one end coupled between the first resistor and the first capacitor, and another end coupled to the power supply coupling element, and wherein the trigger diode is configured to generate the simulated leakage current trigger signal when it is conductive.

8. The leakage current detection and protection device of claim 3,
wherein the first capacitor is configured to provide the auxiliary working power to the leakage current detection module during entire cycles of the AC power.

9. The leakage current detection and protection device of claim 5, wherein the simulated leakage current trigger circuit, the simulated leakage current generating circuit, the trigger signal turn-off module, the fault signal generating module and the self-test compensation module include only discrete components.

10. The leakage current detection and protection device of claim 1, further comprising:
a fault response module, configured to generate an audible or visible alarm signal as a fault indicator, or to disconnect the power supply lines, in response to the self-test fault signal.

11. An electrical power connection device, comprising:
a body; and
the leakage current detection and protection device of claim 1 disposed inside the body.

12. An electrical appliance, comprising:
an electrical load; and
an electrical power connection device coupled between a power supply and the load to supply power to the load, where the electrical power connection device includes the leakage current detection and protection device of claim 1.

13. The leakage current detection and protection device of claim 5, wherein the trigger signal turn-off module includes a first semiconductor device, wherein the first semiconductor device is configured to become conductive in response to the detection feedback signal to provide a discharge path for the first capacitor to turn off the simulated leakage current trigger signal.

14. The leakage current detection and protection device of claim 13, wherein the first semiconductor device is a silicon controlled rectifier (SCR), or a bipolar junction transistor (BJT), or a field-effect transistor (FET), or a photoelectric coupling element.

15. The leakage current detection and protection device of claim 7, wherein the simulated leakage current generating circuit includes a second resistor coupled to the trigger diode, configured to form a current path for the simulated leakage current when the trigger diode is conductive.

16. The leakage current detection and protection device of claim 1, wherein the fault signal generating module includes serial connected third resistor and second capacitor, wherein in response to the simulated leakage current trigger signal, the third resistor charges the second capacitor, and wherein when the leakage current detection module is faulty and does not generate the detection feedback signal to turn off the simulated leakage current trigger signal, the fault signal generating module generates the self-test fault signal at the second capacitor.

17. The leakage current detection and protection device of claim 10, wherein the fault response module includes:
   a switch module coupled on the power supply lines between an input end and an output end, and configured to connect or disconnect an electrical connection between the input end and the output end; and
   a drive module, configured to drive the switch module in response to the self-test fault signal to disconnect the electrical connection.

18. The leakage current detection and protection device of claim 1, wherein the leakage current detection module includes a processor chip and at least one leakage current detector coil, wherein the processor chip is configured to generate the detection feedback signal in response to the leakage current detector coil detecting the leakage current.

19. The leakage current detection and protection device of claim 7, wherein the trigger diode is a semiconductor element that is triggered to conduct when a voltage across it is above a threshold.

* * * * *